United States Patent
Sato

(10) Patent No.: US 8,654,301 B2
(45) Date of Patent: Feb. 18, 2014

(54) ELECTRO-OPTICAL DEVICE

(75) Inventor: Jun Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 13/418,535

(22) Filed: Mar. 13, 2012

(65) Prior Publication Data

US 2012/0236220 A1    Sep. 20, 2012

(30) Foreign Application Priority Data

Mar. 16, 2011   (JP) .................................. 2011-057678

(51) Int. Cl.
*G02F 1/1345*   (2006.01)

(52) U.S. Cl.
USPC .......................................... 349/149; 349/152

(58) Field of Classification Search
USPC ................................................. 349/149, 152
See application file for complete search history.

(56) References Cited

U.S. PATENT DOCUMENTS

| | | | |
|---|---|---|---|
| 7,633,592 B2 * | 12/2009 | Kobashi et al. | ................ 349/152 |
| 7,728,913 B2 | 6/2010 | Mochizuki | |
| 2005/0162605 A1 * | 7/2005 | Murade | ......................... 349/152 |

FOREIGN PATENT DOCUMENTS

| | | |
|---|---|---|
| JP | 2007-47746 A | 2/2007 |
| JP | 2007-65150 A | 3/2007 |

* cited by examiner

*Primary Examiner* — Thanh-Nhan P Nguyen
(74) *Attorney, Agent, or Firm* — ALG Intellectual Property, LLC

(57) ABSTRACT

Inter-substrate connection terminals are provided between four corners of an opposed substrate and a TFT substrate. Lines are provided between first and second terminals in the TFT substrate and an external circuit connection terminal. Lines are provided between first and second terminals, between first and third terminals, between the third and fourth terminals, and between second and fourth terminals, respectively. Lines bypassing the first terminal are provided between lines. A line bypassing the second terminal is provided between lines.

6 Claims, 1 Drawing Sheet

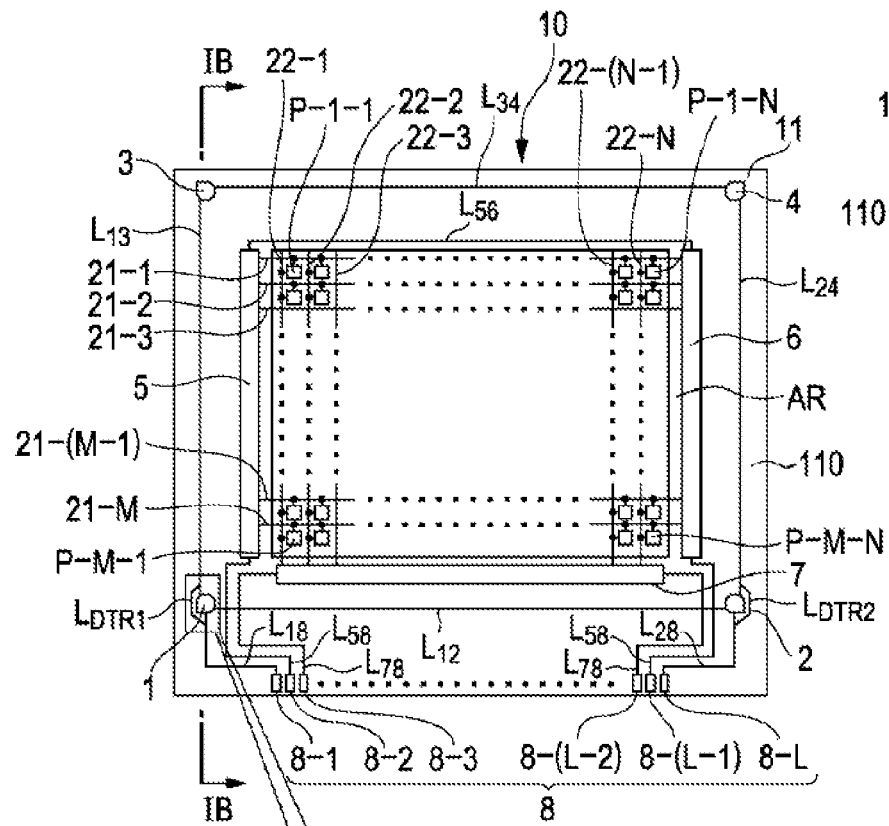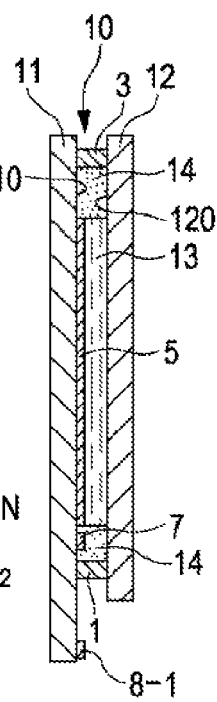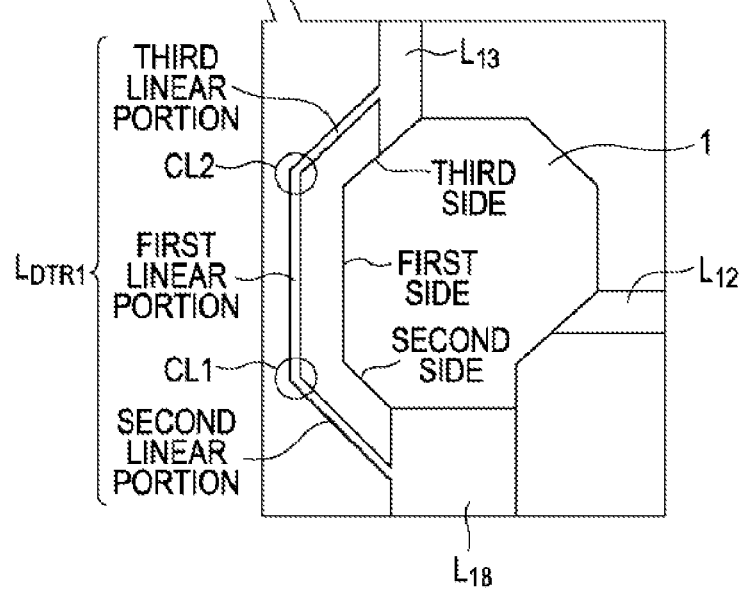

ELECTRO-OPTICAL DEVICE

BACKGROUND

1. Technical Field

The present invention relates to a technique for efficiently performing search of defected parts in an electro-optical device.

2. Related Art

In an electro-optical device mounted as a display device on a mobile phone or a projector, a liquid crystal panel formed by laminating a TFT (Thin Film Transistor) substrate, a liquid crystal layer, and an opposed substrate is provided. A configuration of such a kind of electro-optical device is as follows. In a display area occupying the center of the TFT substrate, pairs of pixel electrodes and TFTs that are active elements performing switching thereof are arranged in a matrix. Opposed electrodes corresponding to the pixel electrodes are provided on the opposed substrate. In the periphery of the display area of the TFT substrate, an external circuit connection terminal that takes the role of receiving an input of various signals from an external IC, a driving circuit that takes the role of driving the TFTs according to image signals, an inter-substrate connection terminal that takes the role of electrically connecting the TFT substrate and the opposed substrate, and lines that connect them are provided. In the electro-optical device having the configuration described above, when common potential (ground) is given from the IC to the external circuit connection terminal, the potential is applied to the opposed substrate through the inter-substrate connection terminal. In this state, the driving circuit drives the TFT according to the image signal given from the IC to the driving circuit through the external circuit connection terminal. Accordingly, the difference between the potential of the pixel electrode connected to the TFT and the potential of the opposed electrode changes, and the light transmission amounts of the pixels (liquid crystal interposed between the pixel electrode and the opposed electrode) change according to the potential difference. An image that is a group of the pixels is expressed by the change in the light transmission amounts of the pixels. A technique relating to such a kind of electro-optical device is disclosed in JP-A-2007-47746.

In such an electro-optical device, a defect may occur in display due to connection failure of an inter-substrate connection terminal. In this case, it is possible to improve the defect in display by repairing the inter-substrate connection terminal causing the connection failure or replacing it with a new terminal. However, hitherto, in such an electro-optical device, a total of four inter-substrate connection terminals are provided in the four corners of the TFT substrate, respectively, and lines connecting the inter-substrate connection terminals to the external circuit connection terminals in series are additionally provided. For this reason, it is difficult to check whether or not the defect in display is improved by cutting each of the lines forming current paths from the IC connected to the external circuit connection terminal to the inter-substrate connection terminals, and it is difficult to efficiently find the terminal with connection failure from among the four inter-substrate connection terminals.

SUMMARY

An advantage of some aspects of the invention is to efficiently find an inter-substrate connection terminal with connection failure when a defect occurs due to the connection failure of the inter-substrate connection terminal of an electro-optical device.

According to an aspect of the invention, there is provided an electro-optical device including: a first substrate that is provided with external circuit connection terminals; a second substrate that is opposed to the first substrate with an electro-optical substance layer interposed therebetween; a plurality of inter-substrate connection terminals that are provided in the first substrate to be electrically connected to the second substrate; a first line that is provided on the first substrate from the external circuit connection terminal to at least one of the inter-substrate connection terminals; a second line that is provided on the first substrate to electrically connect the inter-substrate connection terminals to each other; and a third line that is provided on the first substrate to bypass the inter-substrate connection terminals from the first line to the second line.

According to the aspect of the invention, it is possible to make a current path which includes one or more inter-substrate connection terminals other than the inter-substrate connection terminal and the external circuit connection terminal and does not include the inter-substrate connection terminal in the inter-substrate connection terminals on the first substrate, by sequentially cutting the parts of the first and second lines on the substrate. Accordingly, in the operation of searching for the connection failure parts when the defect caused by the connection failure of the inter-substrate connection terminal occurs in the electro-optical device, check of a defect in display when the current path which does not include the first inter-substrate connection terminal is formed, check of a defect in display when the current path which does not include the first and second inter-substrate connection terminals is formed, and check of a defect in display when the current path which does not include the first, second, and third inter-substrate connection terminals is formed are sequentially performed, and it is possible to efficiently find the connection between the terminals with the connection failure.

In the electro-optical device, the third line may reach the second line from the first line through many curves, and the curve angle of each curved point may be an obtuse angle. Accordingly, the inductance component in the curved point is reduced, and intensity of electric field radiated to the outside is weakened, as compared to the case where the curved point is an acute angle. Accordingly, noise does not easily occur as compared with the case where the curved point is the acute angle, and it is possible to prevent image quality from deteriorating.

More specifically, the inter-substrate connection terminal may include a first side extending in a first direction, and a second side and third side intersecting in the first direction, the third line may include a first linear portion taken along the first side, a second linear portion connecting the first linear portion and the first line along the second side, and a third linear portion connecting the first linear portion and the second line along the third side, and an angle formed by the first linear portion and the second linear portion, and an angle formed by the first linear portion and the third linear portion may be obtuse angles.

BRIEF DESCRIPTION OF THE DRAWINGS

The invention will be described with reference to the accompanying drawings, wherein like numbers reference like elements.

FIGS. 1A and 1B are a front view and a cross-sectional view illustrating an electro-optical device according to an embodiment of the invention.

DESCRIPTION OF EXEMPLARY EMBODIMENTS

A: Configuration

FIG. 1A is a front view illustrating an electro-optical device 10 according to an embodiment of the invention. FIG. 1B is a cross-sectional view along the line IB-IB' shown in FIG. 1A. The electro-optical device 10 operates as a liquid crystal display that irradiates the front side as an image of resolution of M×N pixels with light irradiating the back face of the electro-optical device 10 from a light source (not shown).

As shown in FIG. 1A and FIG. 1B, the electro-optical device 10 includes a liquid crystal layer 13, and a TFT (Thin Film Transistor) substrate 11 and an opposed substrate 12 that are two substrates opposed with the liquid crystal layer 13 interposed therebetween. In FIG. 1A, for convenience, the opposed substrate 12 is not shown. The liquid crystal layer 13 is formed of a plurality of kinds of nematic liquid crystals that are electro-optical substances. The TFT substrate 11 is formed in a flat rectangular shape. The opposed substrate 12 is formed in a flat rectangular shape having a vertical width slightly shorter than the TFT substrate 11. The TFT substrate 11 and the opposed substrate 12 are overlapped to align both ends in a horizontal width direction and one end in a vertical width direction, and is bonded by a seal member 14.

In a rectangular area AR occupying the center of an opposed face 110 that is a face directed to the substrate 12 in the substrate 11, M×N pixel electrodes P-m (m=1 to M)-n (n=1 to N) forming a matrix of the M rows and N columns are provided. In FIG. 1A, for convenience, the dimensions of the pixel electrodes P-m-n are shown larger than their actual sizes. Scanning lines 21-$m$ extending in the horizontal width direction are provided between the pixel electrodes P-m-n adjacent to each other in the vertical width direction on the opposed face 110 of the substrate 11. Data lines 22-$n$ extending in the vertical width direction are provided between the pixel electrodes P-m-n adjacent to each other in the horizontal width direction on the opposed face 110 of the substrate 11. An opposed electrode P' (not shown) opposed to the pixel electrodes P-m (m=1 to M)-n (n=1 to N) of the substrate 12 is provided on the opposed face 120 that is a face directed to the substrate 11 in the substrate 12. Four inter-substrate connection terminals 1, 2, 3, and 4 connecting the substrates 11 and 12 are provided at positions corresponding to four corners of the rectangle surrounding the area AR in the opposed face 110 of the substrate 11. One pixel in the image is configured by the liquid crystal at a part interposed between each of the pixel electrodes P-m (m=1 to M)-n (n=1 to N) in the liquid crystal layer 13 and the opposed electrode P'.

A line $L_{12}$ connecting both terminals 1 and 2 is provided between the inter-substrate connection terminal 1 and the inter-substrate connection terminal 2 on the opposed face 110 of the substrate 11. A line $L_{13}$ connecting both terminals 1 and 3 is provided between the inter-substrate connection terminal 1 and the inter-substrate connection terminal 3 on the opposed face 110 of the substrate 11. A line $L_{34}$ connecting both terminals 3 and 4 is provided between the inter-substrate connection terminal 3 and the inter-substrate connection terminal 4 on the opposed face 110 of the substrate 11. A line $L_{24}$ connecting both terminals 2 and 4 is provided between the inter-substrate connection terminal 2 and the inter-substrate connection terminal 4 on the opposed face 110 of the substrate 11.

Scanning line driving circuits 5 and 6 are provided on both sides in the horizontal width direction with the area AR interposed therebetween on the opposed face 110 of the substrate 11. The scanning line driving circuits 5 and 6 are connected to one end and the other end of the scanning lines 21-$m$ (m=1 to M). A line $L_{56}$ connecting both circuits 5 and 6 is provided between end portions of the sides of the inter-substrate connection terminals 3 and 4 in the scanning line driving circuits 5 and 6.

A data line driving circuit 7 is provided between the area AR and the line $L_{12}$ on the opposed face 110 of the substrate 11. The data line driving circuit 7 is connected to one end of the data lines 22-$n$ (n=1 to N). An external circuit connection terminal group 8 is provided between the line $L_{12}$ on the opposed face 110 of the substrate 11 and the end portion on the side of the line $L_{12}$ in the vertical width direction of the opposed face 110. The external circuit connection terminal group 8 is a group of L terminals 8-$i$ (i=1 to L) arranged in the horizontal width direction. Two terminals 8-1 and 8-L of both ends in the L terminals 8-$i$ (i=1 to L) are terminals to which common potential (ground) LCC is supplied from an external IC. The terminals 8-2 and the 8-(L-1) inside the terminals 8-1 and 8-L are terminals to which synchronization signals CL that are control signals of the scanning line driving circuit 5 and 6 is supplied from the external IC. The other terminals 8-3 to 8-(L-2) are terminals to which an image signal VID that is a control signal of the data line driving circuit 7 is supplied from the external IC. A line $L_{18}$ reaching the inter-substrate connection terminal 1 from the external circuit connection terminal 8-1 is provided between the external circuit connection terminal 8-1 and the inter-substrate connection terminal 1 just next thereto on the opposed face 110 of the substrate 11. A line $L_{28}$ reaching the inter-substrate connection terminal 2 from the external circuit connection terminal 8-L is provided between the external circuit connection terminal 8-L and the inter-substrate connection terminal 2 just next thereto on the opposed face 110 of the substrate 11.

In the state where the external circuit connection terminals 8-$i$ (i=1 to L) in the external circuit connection terminal group 8 is connected to the external IC, a current path including the external IC, the external circuit connection terminals 8-1 and 8-L, the inter-substrate connection terminals 1, 2, 3, and 4, and the opposed substrate 12 is formed, and potential of the opposed electrode P' of the opposed substrate 12 is LCC. In this state, the scanning line driving circuits 5 and 6 and the data line driving circuit 7 drives the pixel electrodes P-m-n according to the signals CL and VID supplied from the external IC. By the driving of the pixel electrodes P-m-n, a potential difference between the pixel electrodes P-m-n and the opposed electrode P' is changed, transmission light quantity of the pixels (liquid crystals interposed between the pixel electrode P-m-n and the opposed electrode P') is changed according to the potential difference. Accordingly, the image of resolution of M×N pixels is irradiated toward the front face of the electro-optical device 10.

In FIG. 1A, a line $L_{DTR1}$ (third line) reaching the line $L_{13}$ through a path bypassing the inter-substrate connection terminal 1 from the line $L_{18}$ is provided between the line $L_{18}$ (first line) and the line $L_{13}$ (second line) on the opposed face 110 of the substrate 11. A line $L_{DTR2}$ reaching the line $L_{24}$ through a path of bypassing the inter-substrate connection terminal 2 from the line $L_{28}$ is provided between the line $L_{28}$ and the line $L_{24}$ on the opposed face 110. More specifically, the line $L_{DTR1}$ is branched at an angle of 45° to the opposite side to the side of the line $L_{12}$ from the position just before reaching the inter-substrate connection terminal 1 in the line $L_{18}$, and is joined with the line $L_{13}$ capable of passing through a curve of an angle of 135° at the first curved point CL1 and a curve of an angle of 135° at the second curved point CL2 before that. The line $L_{DTR2}$ is branched at an angle of 45° to the opposite side to the side of the line $L_{12}$ from the position just before reaching the inter-substrate connection terminal 2 in the line $L_{28}$, and is joined with the line $L_{24}$ capable of passing through a curve of an angle of 135° at the first curved point CR1 and a curve of an angle of 135° at the second curved point CR2 before that.

As shown in FIG. 1A, the inter-substrate connection terminal 1 includes a first side extending in the first direction, and a second side and a third side intersecting in the first direction. The line $L_{DTR1}$ includes a first linear portion taken along the first side, a second linear portion connecting the first linear portion 13 and the line $L_{18}$, and a third linear portion connecting the first linear portion 13 and the line $L_{13}$ along the third side, and an angle formed by the first linear portion and the second linear portion and an angle formed by the first linear portion and the third linear portion are obtuse angles.

The configuration of the electro-optical device 10 according to the embodiment has been described in detail above. According to the embodiment, it is possible to obtain the following two effects.

First, in the embodiment, the TFT substrate 11 is provided with the line $L_{DTR1}$ bypassing the inter-substrate connection terminal 1 and reaching the line $L_{13}$ from the line $L_{18}$, and the line $L_{DTR2}$ bypassing the inter-substrate connection terminal 2 and reaching the line $L_{24}$ from the line $L_{28}$ are provided. For this reason, according to the embodiment, it is possible to make the current path which includes one or more inter-substrate connection terminals other than the inter-substrate connection terminal and the external circuit connection terminals 8-i and 8-L and does not include the inter-substrate connection terminal in the inter-substrate connection terminals 1, 2, 3, and 4 on the substrate 11, by sequentially cutting the parts of the lines $L_{12}$, $L_{13}$, $L_{18}$, $L_{24}$, $L_{34}$, and $L_{28}$ on the substrate 11. Accordingly, in the operation of searching the connection failure parts when the defect caused by the connection failure of the inter-substrate connection terminal occurs in the electro-optical device 10, check of a defect in display when the current path which does not include the inter-substrate connection terminal 1 is formed, check of a defect in display when the current path which does not include the inter-substrate connection terminals 1 and 2 is formed, and check of a defect in display when the current path which does not include the inter-substrate connection terminals 1, 2, and 3 is formed are sequentially performed, and it is possible to fine the inter-substrate connection terminal with connection failure.

This effect will be described in detail. The operation of searching the connection failure part in the embodiment is performed in the following order. First, an arbitrary part of the line $L_{12}$, a part between a branch point of the line $L_{DTR1}$ of the line $L_{18}$ and the inter-substrate connection terminal 1, and a part between a join point of the line $L_{DTR1}$ of the line $L_{13}$ and the inter-substrate connection terminal 3 are cut respectively. Accordingly, the current path which does not include the inter-substrate connection terminal 1 and includes the external IC, the inter-substrate connection terminal 2, the inter-substrate connection terminal 3, the inter-substrate connection terminal 4, and the opposed substrate 12 is formed. In this state, when the display defect of the electro-optical device 10 is resolved, it is possible to consider that the connection failure was in the inter-substrate connection terminal 1.

Second, the part between the branch point of the line $L_{DTR2}$ of the line $L_{28}$ and the inter-substrate connection terminal 4, and the part between the join point of the line $L_{DTR2}$ of the line $L_{24}$ and the inter-substrate connection terminal 2 are cut respectively. Accordingly, the current path which does not include the inter-substrate connection terminals 1 and 2 and includes the external IC, the inter-substrate connection terminal 3, the inter-substrate connection terminal 4, and the opposed substrate 12 is formed. In this state, when the display defect of the electro-optical device 10 is resolved, it is possible to consider that the connection failure was in the inter-substrate connection terminal 2.

Third, a part between the join point of the line $L_{DTR1}$ of the line $L_{13}$ and the inter-substrate connection terminal 3, and an arbitrary part of the line $L_{34}$ are cut respectively. Accordingly, the current path which does not include the inter-substrate connection terminals 1, 2, and 3 and includes the external IC, the inter-substrate connection terminal 4, and the opposed substrate 12 is formed. In this state, when the display defect of the electro-optical device 10 is resolved, it is possible to consider that the connection failure was in the inter-substrate connection terminal 3. When the display defect is not yet resolved, it is possible to consider that the connection failure was in the inter-substrate connection terminal 4.

In the embodiment, the line $L_{DTR1}$ reaches the line $L_{13}$ from the line $L_{18}$ through many curves, and the curve angles of the curved points CL1 and CL2 in the line $L_{DTR1}$ are obtuse angles. The line $L_{DTR2}$ reaches the line $L_{24}$ from the line $L_{28}$ through many curves, and the curve angles of the curved points CR1 and CR2 in the line $L_{DTR2}$ are also obtuse angles. For this reason, the intensity of electric field in the curved points is weakened as compared with the case where the curved points are the acute angles. Accordingly, noise does not easily occur as compared with the case where the curved point is the acute angle, and it is possible to prevent image quality from deteriorating.

B: Modification

The embodiment of the invention has been described above, but the following modification may be added to the embodiment.

(1) In the embodiment, the number of inter-substrate connection terminals 1, 2, 3, and 4 between the TFT substrate 11 and the opposed substrate 12 is four. However, the number may be two or three, and may be five or more.

(2) In the embodiment, the line $L_{DTR1}$ reaches the line $L_{13}$ through two curves from the line $L_{18}$, and the line $L_{DTR2}$ reaches the line $L_{24}$ through two curves from the line $L_{28}$. However, the number of curves times in the line $L_{DTR1}$ and the number of curves in the line $L_{DTR2}$ may be once, three times, or more.

(3) In the embodiment, the angles of the curved points of the lines $L_{DTR1}$ and $L_{DTR2}$ are obtuse angles. However, the angles may be acute angles. A part of the angles in the plurality of curved points may be obtuse, and the others may be acute.

(4) In the electro-optical device according to the embodiment of the invention, discrimination of a self-light emission type emitting light by itself and a non-light emission type of changing transmittance or reflectance of the external light, and discrimination of a current driving type with the supply of electric current and a voltage driving type by applying an electric field (voltage) are irrespective. The invention is applied to the electro-optical device using various electro-optical elements such as an organic EL element, an inorganic EL element, an LED (Light Emitting Diode), a field-emission element (FE element), a surface conduction electron emitter element (SE element), a ballistic electron emitting element (BS element), an electrophoretic element, and an electrochromic element. That is, the electro-optical element includes a driven element (generally, display element in which gradation is controlled according to a gradation signal) using the electro-optical substances in which gradation (optical characteristics such as transmittance and brightness) is changed according to electrical action such as the supply of electric current and the application of voltage (electric field).

This application claims priority from Japanese Patent Application No. 2011-057678 filed in the Japanese Patent Office on Mar. 16, 2011, the entire disclosure of which is hereby incorporated by reference in its entirely.

What is claimed is:

1. An electro-optical device comprising:
a first substrate that is provided with an external circuit connection terminal;
a second substrate that is opposed to the first substrate with an electro-optical substance layer interposed therebetween;
a plurality of inter-substrate connection terminals that are provided in the first substrate to be electrically connected to the second substrate;
a first line that is provided on the first substrate from the external circuit connection terminal to at least one of the inter-substrate connection terminals;
a second line that is provided on the first substrate to electrically connect the inter-substrate connection terminals to each other; and
a third line that is provided on the first substrate to bypass the inter-substrate connection terminals from the first line to the second line.

2. The electro-optical device according to claim 1, wherein the third line reaches the second line from the first line through many curves, and a curve angle of each curved point that is an obtuse angle.

3. The electro-optical device according to claim 2, wherein the inter-substrate connection terminal includes a first side extending in a first direction, and a second side and third side intersecting in the first direction,
wherein the third line includes a first linear portion taken along the first side, a second linear portion connecting the first linear portion and the first line along the second side, and a third linear portion connecting the first linear portion and the second line along the third side, and
wherein an angle formed by the first linear portion and the second linear portion, and an angle formed by the first linear portion and the third linear portion are obtuse angles.

4. An electro-optical device comprising:
a first substrate that is provided with an external connection terminal;
a second substrate that is opposed to the first substrate and has a common electrode; and
an electro-optical substance layer that is interposed between the first substrate and the common electrode,
wherein the first substrate including:
a first terminal that is electrically connected to the common electrode,
a second terminal that is electrically connected to the common electrode,
a first wiring that is electrically connected to the external connection terminal and the first terminal,
a second wiring that is electrically connected to the first terminal and the second terminal, and
a third wiring that is electrically connected to the first wiring by direct and physical contact, is electrically connected to the second wiring by direct and physical contact, and is separated from the first terminal.

5. The electro-optical device according to claim 4,
the external connection terminal is disposed between the first terminal and a first side of the first substrate, and
the third wiring is disposed between a second side crossing the first side of the first substrate and the first terminal, the first wiring or the second wiring.

6. The electro-optical device according to claim 4,
the first wiring is wider than the second wiring, and
the second wiring is wider than the third wiring.

* * * * *